United States Patent [19]

Tsutsumi

[11] Patent Number: 4,517,453
[45] Date of Patent: May 14, 1985

[54] HOT TIP BUSHING MEANS FOR A SYNTHETIC RESIN INJECTION MOLDING MACHINE

[76] Inventor: Shigeru Tsutsumi, Yamagata, Japan

[21] Appl. No.: 573,828

[22] Filed: Jan. 24, 1984

[30] Foreign Application Priority Data

Feb. 2, 1983 [JP] Japan .................... 58-14519

[51] Int. Cl.³ ............................... F27B 14/06
[52] U.S. Cl. .................... 219/421; 219/424;
219/426; 219/523; 219/530; 219/544; 219/540;
222/146.5; 425/548; 425/549
[58] Field of Search ............... 219/421, 424, 426, 521,
219/530, 540, 544, 523, 552; 222/146 HE;
228/136, 174; 29/611; 425/548, 549, 550, 551, 568

[56] References Cited

U.S. PATENT DOCUMENTS

| | | | |
|---|---|---|---|
| 3,010,154 | 11/1961 | Swenson | 219/421 X |
| 4,033,485 | 7/1977 | Kohler | 222/146 HE |
| 4,230,934 | 10/1980 | ter Beek et al. | 219/421 |
| 4,238,671 | 12/1980 | Gellert | 219/421 |
| 4,279,588 | 7/1981 | Gellert | 425/568 |
| 4,344,750 | 8/1982 | Gellert | 425/548 |
| 4,373,132 | 2/1982 | Vartanian | 219/421 |
| 4,376,244 | 3/1982 | Gellert | 219/523 |

FOREIGN PATENT DOCUMENTS 57-69184  4/1982  Japan .

Primary Examiner—Volodymyr Y. Mayewsky
Attorney, Agent, or Firm—Kramer and Brufsky

[57] ABSTRACT

This invention relates to hot tip bushing means for a synthetic resin injection molding machine, which can reduce the pressure loss at the injection molding time and determine the position of a heating tip easily and accurately. To attain this purpose, a straight resin flow passage is formed axially in a cylindrical body of the hot tip bushing means and the fused resin passing through the straight resin flow passage is heated by an outer heater. Further, a cylindrical body of the hot tip bushing means which is near the heating tip is fit to a mold sprue, thereby the position of the heating tip is determined easily and accurately.

5 Claims, 10 Drawing Figures

4,517,453

HOT TIP BUSHING MEANS FOR A SYNTHETIC RESIN INJECTION MOLDING MACHINE

BACKGROUND OF THE INVENTION

This invention relates to hot tip bushing means for a synthetic resin injection molding machine.

It is known that the hot tip bushing of this sort is used by inserting it in a mold sprue of the injection molding machine. And, fused resin from a runner is injected into a cavity or the resin cooled and solidified in a gate is heated and melted intermittently, subsequently injected intermittently into the cavity.

FIGS. 1 to 4 show respective views of the conventional hot tip bushing means, in which FIG. 1 is a side view thereof, FIG. 2 is a section view taken on line II—II of FIG. 1, FIG. 3 is a rear view of FIG. 2 and FIG. 4 is an expanded section view of the conventional hot tip bushing means which is disposed in a mold.

In 1982 the present Applicant filed a Japanese patent application No. 57-69184 relating to this conventional hot tip bushing means.

An example of the conventional hot tip bushing means will now be described with reference to FIGS. 1 and 4.

Symbol Bo denotes a hot tip bushing comprising a conical tip 1, a cylindrical body 2 in the middle and a disc type flange 3 in the rear.

Numeral 4 denotes a concave flow path formed axially along the conical tip 1 and the cylindrical body 2. The number of the concave passage 4 is optional, but in this example two concave flow paths 4, 4 are communicated with two paths 5, 5 which are united into one passage 15 at an opening 5a of the disc type flange 3.

The hot tip bushing Bo is made of a heat insulating metal, e.g. a stainless steel or the like. In addition, an external surface thereof is insulated thermally with an oxide layer treatment.

In the interior of the hot tip bushing Bo are disposed a heater 6 for heating locally a pointed end 1a of the conical tip 1 and a second heater 7 for heating a cylindrical body 2.

The heater 6 is communicated with a lead wire 6a, while the second heater 7 is done with a lead wire 7a. The two lead wires 6a, 7a are connected to a power source (not illustrated) from a side hole 8 of the disc type flange 3. Each of the heaters 6, 7 is earthed by connecting to the bushing Bo.

Under the aforesaid structure, as shown in FIG. 4 the hot tip bushing Bo is inserted into a sprue So of a mold M by way of a runner bush 9. Thus, both the hot tip bushing Bo and a manifold 14 are sealed together by a plurality of O-rings 13 by communicating the fused resin flow passage 15 of the manifold 14 with the opening 5a of the disc type flange 3.

Accordingly, there is formed an outer flow path 11 between the sprue So and the hot tip bushing Bo, wherein the disc type flange 3 is fit to the sprue So and contacted with the runner bush 9 on a side wall 10 of the flange 3. Thus, the pointed end 1a of the conical tip 1 is positioned so as to oppose to a gate 17 of a cavity 16.

In the case the fused resin is injected into the mold by way of a nozzle of the injection molding machine, it flows in the two paths 5, 5 by way of the resin flow passage 15 and flows unitedly at the gate 17 by way of the concave flow paths 4, 4 and the outer flow path 11.

The aforesaid conventional hot tip bushing means has the following inconveniences and disadvantages:

(1) The flow passage 15 is bifurcated and deflected at the opening 5a and divided into the two flow paths 5, 5 and the two concave paths 4, 4. In the middle stage the outer flow path 11 is of a tubular flow form. Accordingly, when feeding the fused resin under the application of pressure, a certain resistance from the wall surfaces of the flow paths is imposed upon the fused resin, so that the pressure loss becomes larger.

(2) Since the fused resin which flows in the paths 5, 5, 4, 4, and 11 is heated by the built-in heaters 6, 7 within the hot tip bushing Bo, the fused resin may be solidified and stuck to the inner surface of the sprue So. Namely, due to the inner heating system such a phenomenon is caused on the inner surface of the sprue So far from the heaters 6, 7. As a result, flow of the fused resin gets worse and the pressure loss is increased.

(3) The position of the pointed end 1a of the conical tip 1 is determined by contacting a side wall 10 of the disc type flange 3 with the runner bush 9. Namely, the disc type flange 3 is fit to the sprue So, so that the position of the hot tip bushing Bo is determined in the rear thereof. Accordingly, the conical tip 1 is susceptible to be vibrated, thereby its exact centering relative to the gate 17 gets difficult.

BRIEF SUMMARY OF THE INVENTION

It is therefore a general object of this invention to provide hot tip bushing means for a synthetic resin injection molding machine, which can reduce the pressure loss at the injection molding time and determine the position of a heating tip easily and accurately.

According to a remarkable aspect of this invention, a straight resin flow passage is formed axially in a cylindrical body of the hot tip bushing means and the fused resin passing through the straight resin flow passage is heated by an outer heater. Further, a cylindrical body of the hot tip bushing means which is near the heating tip is fit to a mold sprue, thereby the position of the heating tip is determined easily and accurately.

The above and other related objects and features of this invention will be apparent from a reading of the following description of the disclosure found in the accompanying drawings and the novelty thereof pointed out in the appended claims.

BRIEF DESCRIPTION OF THE ACCOMPANYING DRAWINGS

PREFERRED EXAMPLES OF THE INVENTION

Figure 1:
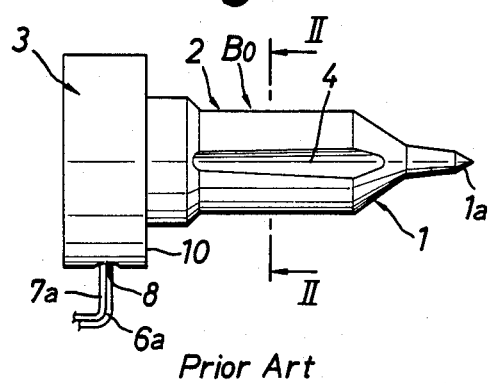
FIG. 1 is a side view of a conventional hot tip bushing means in a synthetic resin injection molding machine.
Figure 2:
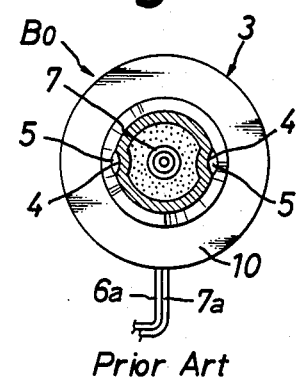
FIG. 2 is a section view taken on line II—II of FIG. 1.
Figure 3:
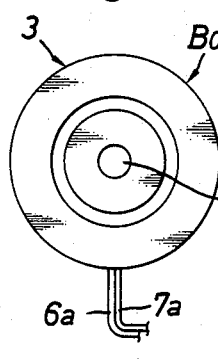
FIG. 3 is a rear view of FIG. 2.
Figure 4:
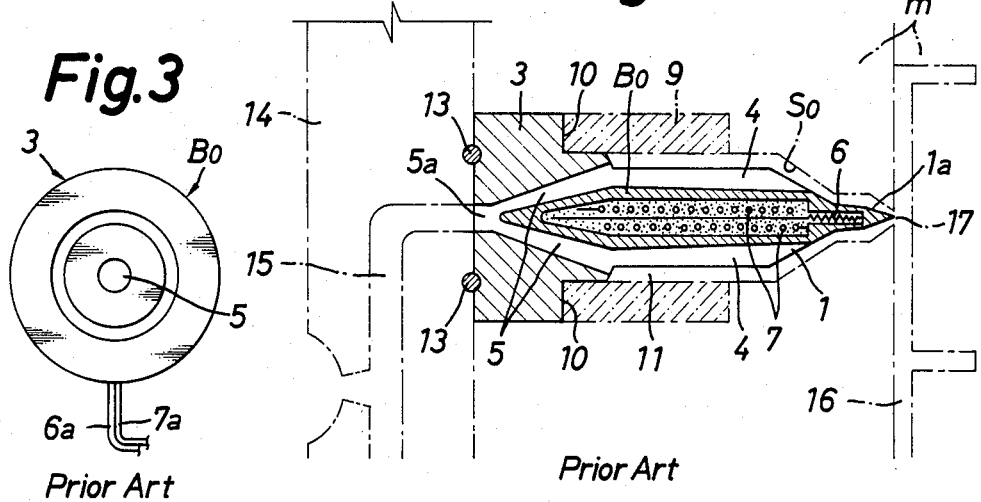
FIG. 4 is a vertical section view of the conventional hot tip means in FIG. 1 which is disposed in a mold.
Figure 5:
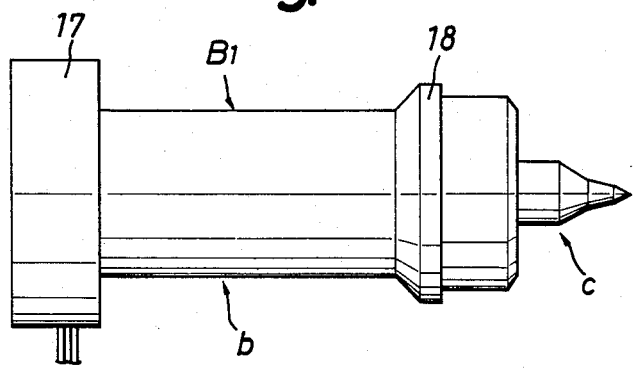
FIG. 5 is a side view of a hot tip bushing means according to this invention.
Figure 6:
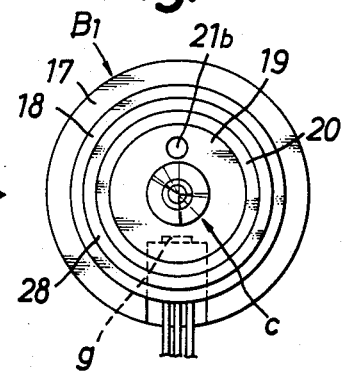
FIG. 6 is a front view of the means in FIG. 5.

A first example of this invention will now be described with reference to FIGS. 5 to 7.

Symbol B1 denotes a hot tip bushing comprising a disc type flange 17 in the rear, a cylindrical body b in the middle having a flange 18 for determining position, and a heating tip c having a pointed head.

The cylindrical body b consists of a body part 19 and a bushing part 20. In the interior of the body part 19 is formed a straight resin flow passage 21 communicated with a side portion of the heating tip c. The straight flow passage 21 consists of a main passage 21a and a branch passage 21b communicated with the side portion of the heating tip c. Along the periphery of the main passage 21a as well as of the branch passage 21b is formed a coiled body heater 22. The coiled body heater 22 is covered by the bushing part 20 and integrally formed therewith by welding. In the interior of the heating tip c is formed a cavity 23 in which a heater 24 for heating only a pointed end locally and intermittently is incorporated.

Numeral 25 denotes a path communicated with a groove g in which the coiled heater 22 is incorporated. The tip heater 24 is connected to a lead wire 24a which passes through the path 25 and the groove g as well. The lead wire 24a is drawn from a drawing inlet 26 formed in the flange 17. In addition to the lead wire 24a, a lead wire 22a for heating the coiled heater 22 and a lead wire 27a for a sensor 27 in the proximity of the body heater 22 are drawn from the drawing inlet 26. The two heaters 22 and 24 are earthed by connecting to the cylindrical body b.

The heater 24 in the heating tip c may be switched on or off by a control unit not illustrated in the drawing.

Numeral 28 denotes a plastic seal sleeve having thermal resistance and thermal expansion. The plastic seal sleeve 28 is fit to the flange 18.

Symbol M denotes a mold and numeral 29 denotes a cavity having a gate 29a. Numeral 30 denotes a manifold and numeral 30a denotes a runner. Numeral 32 denotes a sprue bushing through which a sprue 32a passes. Numeral 33 denotes a bolt. Symbol S1 denotes a sprue for disposing a hot tip bushing B1 in the mold M. Symbol a denotes an air cooling means for cooling the gate 29a of the mold M.

Now, the function of the first example of this invention will now be described.

The heating tip c of the hot tip bushing B1 is inserted into the sprue S1 of the mold M. Then, the seal sleeve 28 of the cylindrical body b and the flange 17 are incorporated in the sprue S1. Subsequently, the two flanges 17, 18 are contacted with side walls 34, 35 respectively. Next to this, while connecting an opening of the straight flow passage 21 to the runner 30a of the manifold 30, the hot tip bushing B1 is fixed with the manifold 30 by means of the bolt 33.

Thus, centering of the gate 29a with the heating tip c can be carried out in the area of the seal sleeve 28 nearest to the heating tip c. Accordingly, a pointed end of the heating tip c is positioned accurately, so that the hot tip bushing B1 is never slipped out of the position.

When the fused resin is injected into the sprue 32a of the sprue bushing 32, it is finally injected into the cavity 29 from the gate 29a by way of the runner 30a, the straight flow passage 21 and a space s of the sprue S1.

Since the straight flow passage 21 is formed by the main passage 21a and the branch passage 21b sloped slightly, resistance of the wall surfaces of the two passages 21a, 21b becomes small, thereby the loss of pressure for feeding the fused resin is reduced. Further, since the fused resin passing through the flow passage 21 is heated by the outer heater 22, it is never solidified unlike the conventional method.

When the temperature of the cylindrical body b is raised by the heater 22, the seal sleeve 28 mounted thereon causes thermal expansion, so that any gap between the sprue S1 and the hot tip bushing B1 is sealed perfectly.

In the space s of the sprue S1, the fused resin existing along the heating tip c is heated by the tip heater 24, while that existing along the mold M is solidified by the cooling means. Therefore, a resin flow passage having a certain width is formed on the periphery of the heating tip c from the branch passage 21b to the gate 29a. Thus, when feeding the fused resin under the application of pressure, any pressure loss does not occur.

When a molding cycle has finished by injecting the fused resin into the cavity 29, the tip heater 24 of the heating tip c is switched off and the fused resin in the gate 29a is cooled and solidified by the cooling means a in the proximity of the gate 29a. However, when a molding cycle starts again, the cooling means a stops actuation and the tip heater 24 is switched on, so that the solidified resin in the gate 29a is again melted.

The tip heater 24 may be preheated constantly. Further, it is optional to adopt the method for enhancing the cooling effect of the fused resin in the gate 29a while synchronizing the tip heater 24 with the cooling device a. Of course, it is optional to operate the tip heater 24 exclusively.

The plastic seal sleeve 28 is very effective for realizing the sealing effect, but it is not always inevitable not only for determining the position of the hot tip bushing B1, but also for preventing leakage of the fused resin. Accordingly, the plastic seal sleeve 28 is replaceable with a stainless steel part which can be produced integrally together with the cylindrical body b.

A second example of this invention will now be described with reference to FIGS. 8 and 9.

Figure 7:
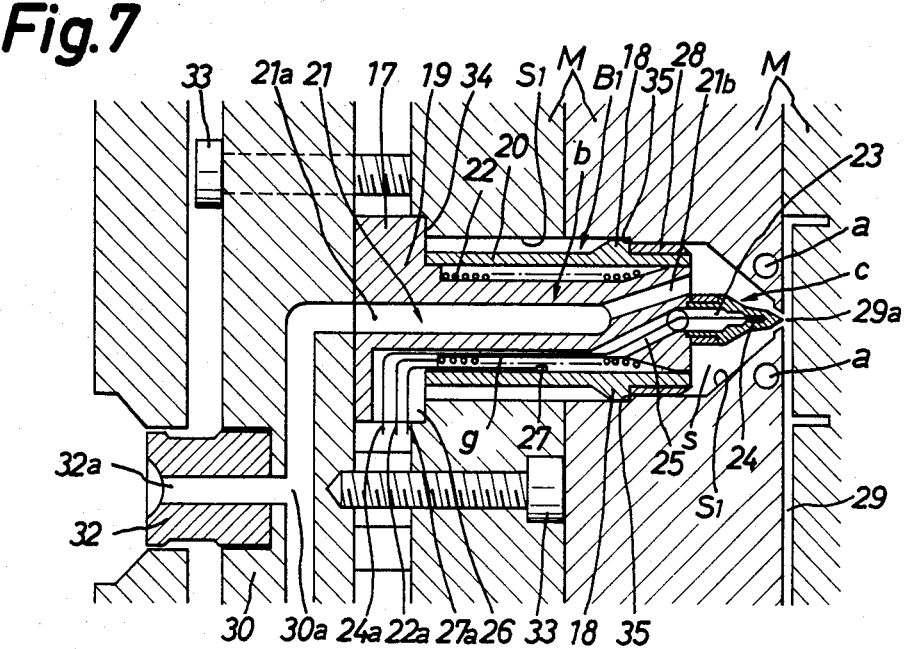
FIG. 7 is a vertical section view of the hot tip bushing means in FIG. 5 which is disposed in a mold.

Since the same construction as shown in FIG. 7 has the same numerals, its description will be omitted.

Figure 8:
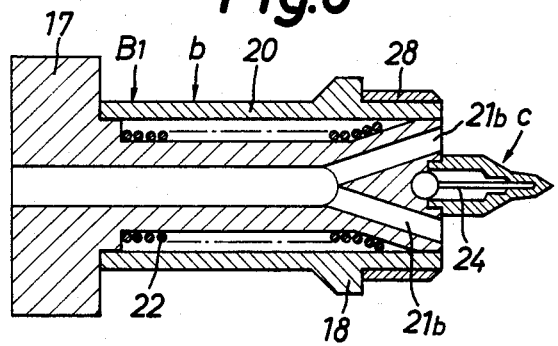
FIG. 8 is a vertical section view of a second example of this invention.
Figure 9:
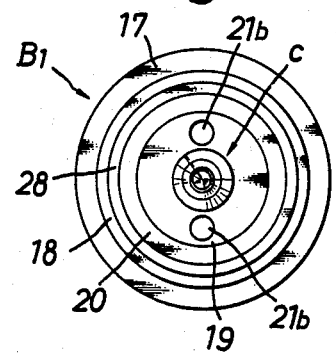
FIG. 9 is a front view of the second example.

According to the second example, the number of the branch passage 21b becomes two as shown in FIG. 8. Since the main passage 21a is bifurcated toward the space a of the sprue S1, the feeding effect of the fused resin is improved better. Other advantages and effects of the second example are the same as those of the first example.

Figure 10:
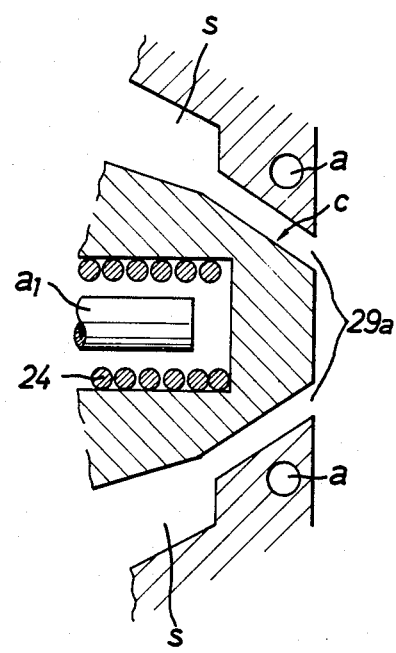
FIG. 10 is a vertical section view of a third example of this invention.

A third example of this invention will now be described with reference to FIG. 10.

The same construction as shown in FIG. 7 has the same numerals, so that its description will be omitted.

According to one aspect of the third example, a pointed end of the heating tip c is flattened, namely the heating tip c is of an approximate frusto-conical shape. Further, an air cooling means a1 is formed within the heating tip c having such a flattened head.

In this case, since the area of the gate 29a becomes larger, this feature is suitable for producing large-sized molded articles by the injection molding.

Further, since the cooling means a1 is incorporated in the heating tip c, its cooling effect is improved much better in comparison with that of the first and second examples. Accordingly, this invention is very effective for preventing sink-marks of the molded articles.

It should be noted that it is also useful to incorporate the aforesaid cooling means a1 in the heating tip c having a pointed end like the first and second examples.

As described above, according to remarkable aspect of this invention, a straight resin flow passage is formed axially in a cylindrical body of the hot tip bushing means and the fused resin passing through the straight flow passage is heated by an outer heater.

Further, a cylindrical body of the hot tip bushing means which is near the heating tip is fit to a mold sprue, thereby the position of the heating tip is determined easily and accurately. Accordingly, this invention enables very effective and smooth injection molding.

What is claimed is:

1. Hot tip bushing means for a synthetic resin injection molding machine comprising:
    a cylindrical body of heat conductive material;
    a heating tip of heat conductive material provided with first heating means inside of said tip secured on the front of said cylindrical body and having a pointed end;
    a straight resin flow passage formed axially in the interior of said cylindrical body and communicating with a side portion of said heating tip;
    second heating means provided inside adjacent the periphery of said cylindrical body for heating resin passing through said straight flow passage; and
    means on said cylindrical body near said heating tip for sealably positioning said tip in a mold sprue.

2. The hot tip bushing means as claimed in claim 1, wherein said cylindrical body includes a disc type flange on the rear thereof and a flange in the middle thereof and for locating the position of said hot tip bushing means in a mold sprue.

3. The hot tip bushing means as claimed in claim 1, wherein said heating tip is provided in its interior with means for cooling said pointed end.

4. The hot tip bushing means as claimed in claim 2, wherein said sealing means includes a plastic seal sleeve susceptible to thermal expansion, said plastic seal sleeve being fit to said middle flange on said cylindrical body for determining the position of said cylindrical body near said heating tip in a mold sprue.

5. The hot tip bushing means as claimed in claim 1, wherein said heating tip has a flattened head on its pointed end, an external circumference of said flattened head forming an annular gate adapted to communicate with a mold cavity.

* * * * *